United States Patent
White, III et al.

(10) Patent No.: US 6,493,661 B1
(45) Date of Patent: Dec. 10, 2002

(54) REUSABLE MULTI-LANGUAGE SUPPORT FACILITY FOR SOFTWARE

(75) Inventors: William A. White, III, Carlisle; David Boyle, Groveland; Jonathan A. Beaupre, Haverhill, all of MA (US)

(73) Assignee: Scheider Automation, Inc., North Andover, MA (US)

( * ) Notice: Subject to any disclaimer, the term of this patent is extended or adjusted under 35 U.S.C. 154(b) by 0 days.

(21) Appl. No.: 09/571,923

(22) Filed: May 16, 2000

(51) Int. Cl.[7] ............................................. G06F 17/20
(52) U.S. Cl. ......................................... 704/8; 707/536
(58) Field of Search .............................. 704/8, 2, 3, 4, 704/5, 6, 7; 707/536

(56) References Cited

U.S. PATENT DOCUMENTS

| | | | |
|---|---|---|---|
| 5,442,782 A | * 8/1995 | Malatesta et al. | 707/4 |
| 5,583,761 A | * 12/1996 | Chou | 707/536 |
| 5,664,206 A | * 9/1997 | Murow et al. | 704/8 |
| 5,903,859 A | * 5/1999 | Stone et al. | 704/8 |
| 5,917,484 A | * 6/1999 | Mullaney | 345/333 |
| 6,092,036 A | * 7/2000 | Hamann | 704/8 |
| 6,092,037 A | * 7/2000 | Stone et al. | 704/8 |

* cited by examiner

Primary Examiner—Patrick N. Edouard
(74) Attorney, Agent, or Firm—Michael J. Femal; Larry I. Golden

(57) ABSTRACT

A software system that includes text messages intended for viewing by a user, where the user can select at any time from various supported spoken languages, the language in which the text messages are to be provided, i.e. a multi-language software system. It includes: a software build, responsive to a specified language indicating the spoken language in which text messages are to be provided, and further responsive to a request for text messages on a particular topic, for providing a language-independent identifier corresponding to the requested text message along with the specified language, further responsive to a text message string in the specified language, the text message string corresponding to the identifier and to the specified language, for providing the text message string in the specified language to the user; and a text message system database, responsive to the identifier corresponding to the requested text message and to the specified language, for providing to the software build the text message string in the specified language. In another aspect of the invention, what is provided is a system and corresponding method for providing the multi-language software system.

3 Claims, 3 Drawing Sheets

| Identier | Language | Text String |
|---|---|---|
| 01x12345678 | English | To alter a property, select x from the y menu ... |
| | French | La même chose en Français |
| | German | Das gleiche auf deutsch |
| | ... | ... |
| 02y09378403 | English | To add a control field, select s from the t menu ... |
| | French | La même chose en Français |
| | German | Das gleiche auf deutsch |
| ... | | ... |

Fig. 3

REUSABLE MULTI-LANGUAGE SUPPORT FACILITY FOR SOFTWARE

BACKGROUND OF THE INVENTION

1. Technical Field

The present invention pertains to the field of software implementation. More particularly, the present invention pertains to implementing software so as to provide text messages in a spoken language (as opposed to a computer programming language) that can be selected at run-time.

2. Description of Related Art

In today's global market, help systems for software must provide help in several different spoken languages. According to the prior art, the spoken language in which help for a software system is provided must often be selected when the software is installed. The prior art also teaches creating one build of software (compiling and linking the elements of the software) providing help in one spoken language, and another build providing help in another spoken language.

What is needed is a way to provide help in using software that allows a user to change the spoken language in which help is provided without reinstalling the software.

SUMMARY OF THE INVENTION

Accordingly, the present invention provides a software system that includes text messages intended for viewing by a user. It includes: a software build, responsive to a specified language indicating the spoken language in which text messages are to be provided, and further responsive to a request for text messages on a particular topic, for providing a language-independent identifier corresponding to the requested text message along with the specified language, further responsive to a text message string in the specified language, the text message string corresponding to the identifier and to the specified language, for providing the text message string in the specified language to the user; and a text message system database, responsive to the identifier corresponding to the requested text message and to the specified language, for providing to the software build the text message string in the specified language.

In another aspect of the invention, what is provided is a system and corresponding method for providing a software system that includes text messages intended for viewing by a user. The system includes: a filter, responsive to an unfiltered software source code, for parsing the unfiltered software source code and replacing with corresponding identifiers the text-replacement macros, each having as arguments a text string and an indicator of a corresponding first language, for providing a filtered software source code including the identifiers in place of the text-replacement macros, and further for providing the text message string and the indicator of the corresponding first language; a compiler, responsive to the filtered software source code, for providing a corresponding software build; and a text message system database, responsive to the text message string and to the indicator of the corresponding first language, and further responsive to text message strings, for each identifier, in languages other than the specified language and to indicators of the languages other than the specified language, and still further responsive to a specified language and to a text message string identifier, for providing a text message string in the specified language. In this aspect of the invention, the software build provides the specified language and a text message string identifier to the text message system database in response to a user action.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
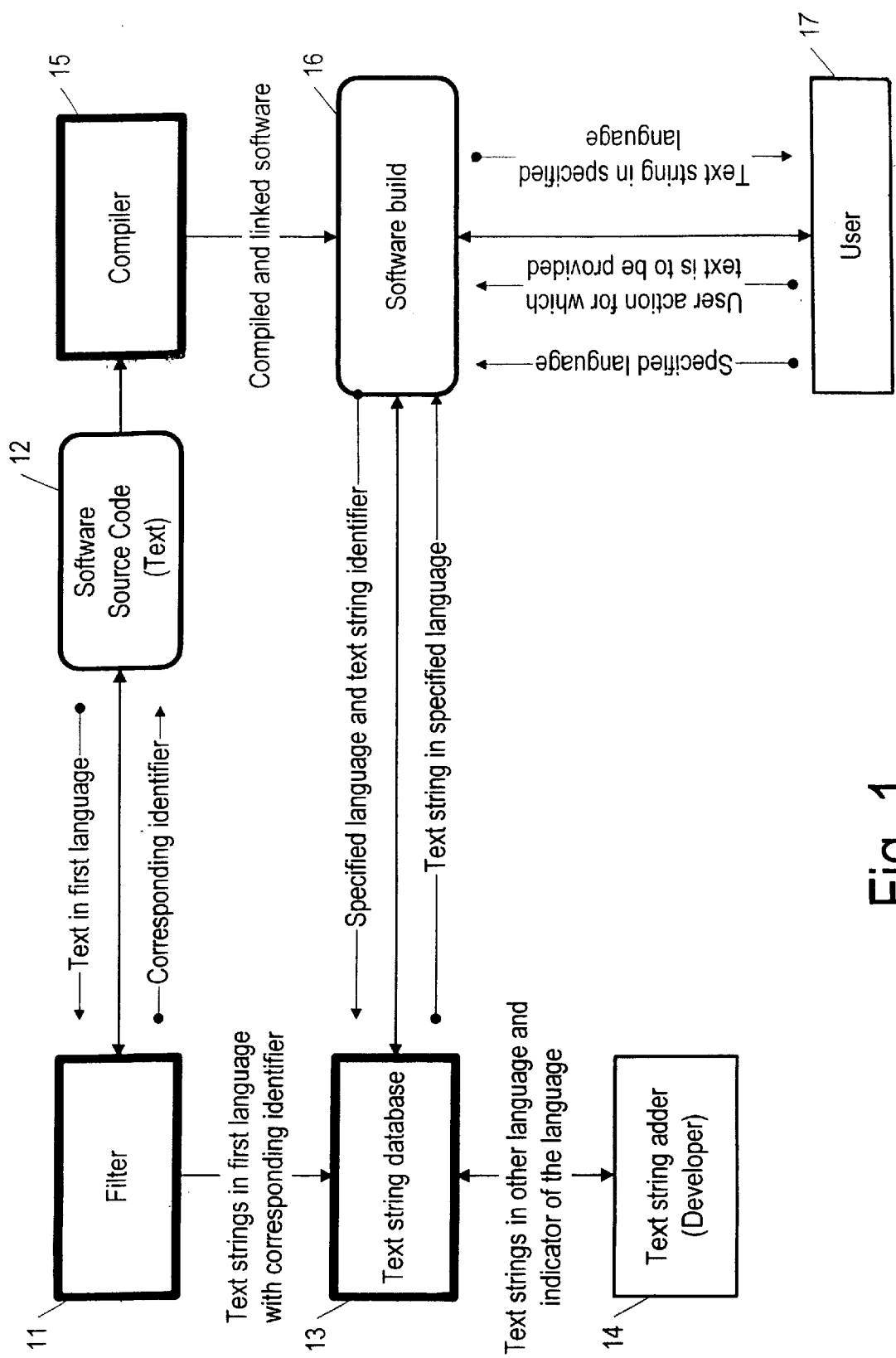
FIG. 1 is a block diagram/data flow diagram showing a system, according to the present invention, that creates a software build that can provide text messages in different spoken languages using an associated text message system database.

Referring now to FIG. 1, the system of the present invention is shown as including a filter 11, a compiler 15, and a text message system database (or text string database) 13. The system is used to produce a software build 16 that allows a user to specify, at run-time, the language in which text messages are to be provided. Moreover, the different spoken languages from which a user can select that text messages are to be provided in can be changed without affecting the software build 16.

The flexibility in choosing the language in which text messages are to be provided and in changing the different languages from which a user can choose for text messages to be provided in is made possible by arranging that the software build 16 extracts help from an associated, free-standing text message system database 13. When the software is required to present a text message, typically as the result of an action by the user, the correct text message is extracted from the text message system database 13 based on an identifier known by the software build to correspond to the text message needed by the user, and based on the user having specified the language in which the text message is to be provided.

Figure 2:
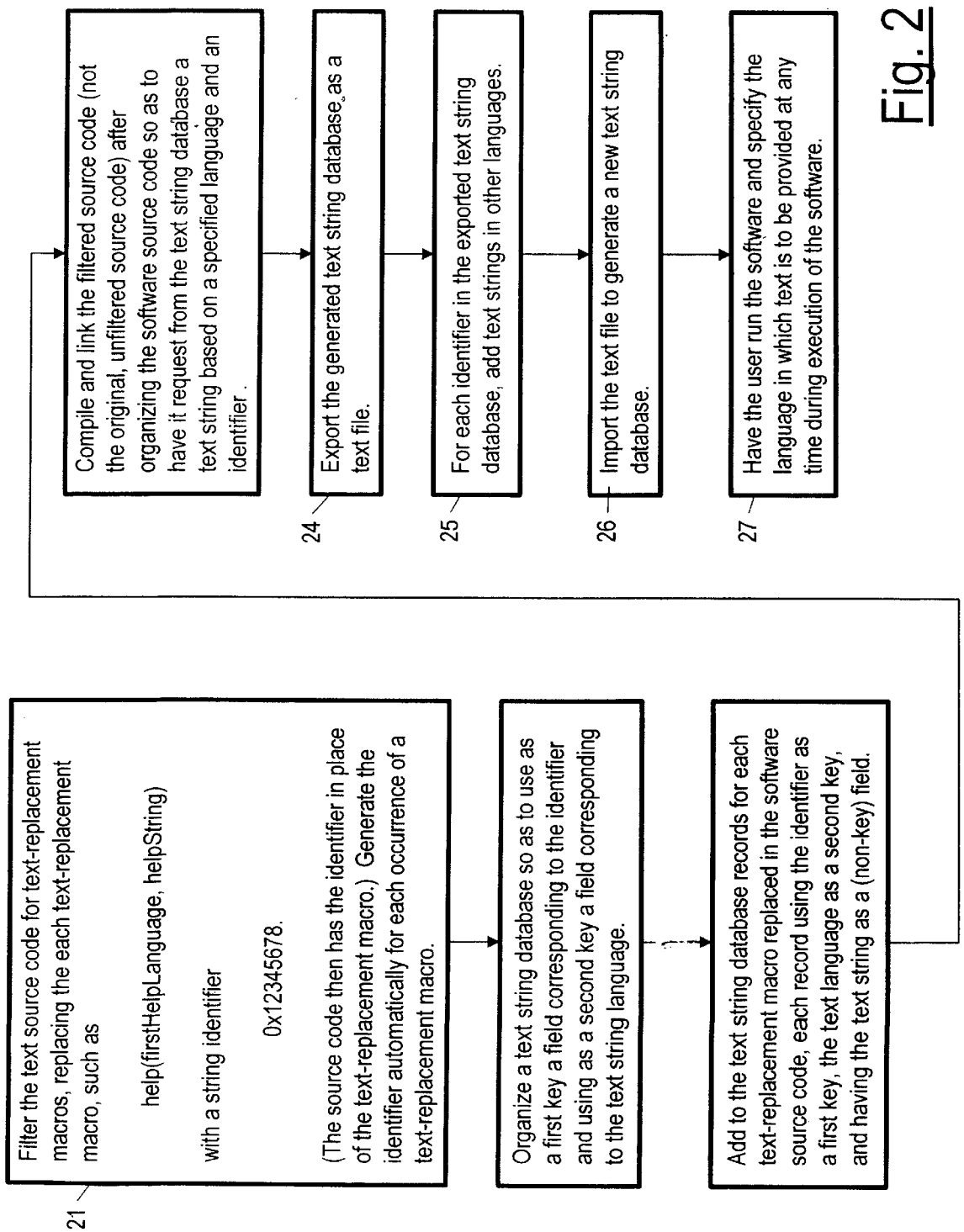
FIG. 2 is a flow chart showing the steps of the present invention used to create a software build that can provide text messages in different spoken languages and indicating that the language in which text messages are provided is specified at run time.

To provide the flexibility, the filter 11 parses a software source code 12 (text), from which the software build 16 will ultimately be derived, in search of text-replacement macros. Referring for the moment to FIG. 2, the filtering of the software source code 12 by the filter 11 is described in a step 21 in which the filter replaces each text-replacement macro, such as, Help(helpLanguage, helpString)

with a (spoken as opposed to computer programming) language-independent string identifier, such as,

0X12345678.

The identifiers are created automatically by the filter 11 when it encounters each next text-replacement macro in the course of parsing the software source code 12. The filter 11 then stores the original string from the software source code text file (helpString in the example above), written in one particular spoken language, in the text message system database 13, using the identifier as a first key or search field, and the specified (spoken) language (helpLanguage in the example above) as a second key or search field. Later, for each identifier, text strings are provided by a text string adder 14 (preferably a member of a development team) in additional spoken languages using the identifier for the first key (or search field) and the text message language for each additional string as the second key (or search field), i.e. using an identifier of the language in which the text message is expressed as the second key or search field. Each text message string associated with a particular set of keys is itself a non-key field.

The term software source code is to be understood expansively, i.e. to include not only files of programming statements in one or another programming language, such as C++ or Fortran, but also related resource files, such as string tables, dialog descriptors control definitions such as button descriptors and list box descriptors, and so on. Although such related source files are not translated or compiled into machine instructions, they are part of the source code for a software product, and so considered part of a software build.

After the filter completes its filtering of the software source code 12, the compiler 15 creates a software build 16 from the filtered software source code 12, which includes only identifiers, not text-replacement macros. Then at run time (i.e. at any time during execution of the software build 16), a user 17 can specify the language in which the user would like text messages to be provided, and subsequent requests for text messages by the user 17 will be provided by the software build 16 in the specified language, at least until a user specifies a different language in which text messages are to be provided.

Referring now to FIG. 2, a method of creating a software build that is independent of any spoken language is shown as including a step 24, where the text message system database 13 (FIG. 1) is converted to a text file before adding messages in the various spoken languages that are to be supported. Then in a step 25, for each string in the text message system database, text messages are added in each of the other supported spoken languages. Finally, in a step 26, the text file is converted back to a text message system database 13, this time including all of the supported (spoken) languages.

Alternatively, the text message system database 13 could allow a developer team member to add text messages in each of the supported spoken languages without converting the text message system database to a text file. In such an embodiment, the text message system database would include a database manager, and the software build 16 would either request messages from the text message system database manager, or would access the data directly. To access the data directly, the software build 16 would include some of the functionality of the database manager, in particular the functionality required to find a record in the database, extract it, and read it.

Referring now to FIG. 3, the structure of the text message system data is shown as organized first by the language-independent identifier (which is known to the software build) to indicate the message content for a particular topic without regard for the language in which the content is expressed, then by an indicator of a supported (spoken) language. For each identifier and supported language, the corresponding text message content is expressed in the supported language.

Although the present invention can be used merely to replace each text-replacement macro with a corresponding message identifier, it can also be used to substitute more complex expressions involving part or all of the text originally occurring in the source code, instead of or in addition to substituting an identifier. For example, any or all of the following substitutions are possible, in any combination:

an identifier static text defined at the time of filtering (e.g. function calls to be executed at run-time);

a text-replacement macro name;

a language as specified in a text-replacement macro; and a string as specified in a text-replacement macro.

For example, in substituting for a (text) string, the entire text-replacement macro containing the string can be replaced, either by an identifier or static text. Alternatively, only a part of the text-replacement macro containing the string might be replaced, such as the macro name, the text language indicator, or the text string.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A software system that includes text messages viewable by a user, comprising:

a) a software build, responsive to a specified language indicating the spoken language in which text messages are to be provided, and further responsive to a request for text messages on a particular topic, for providing a language-independent identifier corresponding to the requested text message along with the specified language, further responsive to a text message string in the specified language, the text message string corresponding to the language-independent identifier and to the specified language, for providing the text message string in the specified language to the user; and b) a text message system database, responsive to the language-independent identifier corresponding to the requested text message and to the specified language, for providing to the software build the text message string in the specified language;

wherein the software build is derived from a source code including text-replacement macros for each text message to be provided, each text-replacement macro having as arguments a text string and an indicator of a corresponding first language, the source code being filtered so as to replace each text-replacement macro with a language-independent identifier of the text message to be provided, thereby providing that the software build includes language-independent identifiers of text messages in place of the text-replacement macros.

2. A system, comprising:

a) a filter, responsive to an unfiltered software source code, for parsing the unfiltered software source code and replacing with corresponding language-independent identifiers at least some text-replacement macros, each having as arguments a text string and an indicator of a corresponding first language, for providing a filtered software source code including the language-independent identifiers in place of the text-replacement macros, and further for providing the text message string and the indicator of the corresponding first language;

b) a compiler, responsive to the filtered software source code, for providing a corresponding software build;

c) a text message system database, responsive to the text message string and to the indicator of the corresponding first language, and further responsive to text message strings, for each language-independent identifier, in languages other than the specified language and to indicators of the languages other than the specified language, and still further responsive to a specified language and to a text message string identifier, for providing a text message string in the specified language;

wherein the software build provides the specified language and the text message string identifier to the text message system database in response to a user action.

3. A method, comprising the steps of:

a) filtering an unfiltered software source code so as to replace with a corresponding language-independent identifier each text-replacement macro having as arguments a text message string and an indicator of a corresponding first language;

b) for each language-independent identifier added to the software source code in replacement of a text-replacement macro, adding to a text message system database the identifier along with the text message string and the indicator of the corresponding first language;

c) organizing the text message system database to use as a first key a field corresponding to the language-independent identifier and using as a second key a field corresponding to the text message string language;

d) for each language-independent identifier added to the text message system database, adding a text message string in at least one language other than the first language;

e) organizing the software source code so as to have the software source code request from the text message system database a text message string based on one or another of the specified languages and one or another of the language-independent identifiers, and so providing a filtered source code; and f) compiling the filtered software source code so as to provide a corresponding software build.

* * * * *